United States Patent
Choi et al.

(10) Patent No.: US 7,804,792 B2
(45) Date of Patent: Sep. 28, 2010

(54) METHOD AND APPARATUS FOR TRANSMITTING AND RECEIVING DATA IN A COMMUNICATION SYSTEM

(75) Inventors: Jin-Ghoo Choi, Seoul (KR); Sung-Soo Hwang, Suwon-si (KR); Sang-Boh Yun, Seongnam-si (KR); Kyung-Ho Sohn, Seoul (KR); Young-Yong Kim, Seoul (KR); Chung-Ha Koh, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 155 days.

(21) Appl. No.: 12/080,616

(22) Filed: Apr. 4, 2008

(65) Prior Publication Data
US 2008/0247391 A1    Oct. 9, 2008

(30) Foreign Application Priority Data
Apr. 4, 2007    (KR) ...................... 10-2007-0033502

(51) Int. Cl.
*H04B 7/005* (2006.01)
*H04J 3/16* (2006.01)
*H04J 3/24* (2006.01)
(52) U.S. Cl. .................. 370/278; 370/346; 370/349
(58) Field of Classification Search .............. None
See application file for complete search history.

(56) References Cited

U.S. PATENT DOCUMENTS

| | | | | |
|---|---|---|---|---|
| 7,236,801 | B2* | 6/2007 | Yun et al. ................... | 455/522 |
| 7,317,702 | B2* | 1/2008 | Dominique et al. ......... | 370/328 |
| 7,454,181 | B2* | 11/2008 | Banister et al. ............. | 455/133 |
| 7,492,699 | B2* | 2/2009 | Cho ........................... | 370/203 |
| 2007/0135133 | A1* | 6/2007 | Ishii et al. ................... | 455/453 |
| 2009/0111475 | A1* | 4/2009 | Yang et al. .................. | 455/450 |
| 2009/0196190 | A1* | 8/2009 | Li et al. ...................... | 370/252 |
| 2009/0232062 | A1* | 9/2009 | Higuchi et al. .............. | 370/329 |

FOREIGN PATENT DOCUMENTS

KR    1020030092894 A    12/2003

\* cited by examiner

*Primary Examiner*—Chi H Pham
*Assistant Examiner*—Soon-Dong D Hyun

(57) ABSTRACT

A method for receiving multicast service data by a terminal in a communication system. The method includes receiving a pilot from a base station, measuring channel state information using the received pilot, and transmitting the channel state information to the base station; receiving a frame from the base station, and determining whether there is an error in the received frame; when no error has occurred in the received frame, determining whether the number of frames consecutively received without error is greater than or equal to a predetermined number; and when the number of frames consecutively received without error is greater than or equal to the predetermined number, transitioning to a non-feedback state where the terminal transmits no channel state information to the base station. The frame includes multicast service data.

22 Claims, 9 Drawing Sheets

METHOD AND APPARATUS FOR TRANSMITTING AND RECEIVING DATA IN A COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Apr. 4, 2007 and assigned Serial No. 2007-33502, the disclosure of which is incorporated herein by reference.

TECHNICAL FIELD OF THE INVENTION

The present invention relates generally to a method and apparatus for transmitting and receiving data in a communication system, and in particular, to a method and apparatus for reducing Channel Quality Information (CQI) feedback during data transmission/reception for multicast services.

BACKGROUND OF THE INVENTION

Generally, multicast service transmits corresponding data by adjusting modulation and coding rate to the user having the lowest channel gain among the users in order to allow all users in a corresponding multicast user group to normally receive the multicast service.

For example, in Multimedia Broadcast Multicast Service (MBMS) system defined by $3^{rd}$ Generation Partnership Project (3GPP), BroadCast MultiCast Service (BCMCS) system defined by $3^{rd}$ Generation Partnership Project-2 (3GPP2), and 802.16 system defined by IEEE for multicast services, a base station transmits corresponding data by adjusting the modulation and coding rate to the user having the lowest channel gain without using Channel Quality Information (CQI). The foregoing conventional data transmission method can reduce the system complexity and obtain macro diversity gain. However, the conventional data transmission method may cause a waste of transmission power and cannot efficiently use wireless resources.

SUMMARY OF THE INVENTION

An aspect of the present invention to address at least the problems and/or disadvantages and to provide at least the advantages described below. Accordingly, an aspect of the present invention is to provide a method and apparatus in which a base station acquires CQI information for each of users in a multicast user group thereby to perform power allocation appropriate to a corresponding user taking Bit Error Rate (BER) constraint of each user into consideration.

Another aspect of the present invention is to provide a method and apparatus for efficiently transmitting data using Adaptive Modulation and Coding (AMC).

Further another aspect of the present invention is to provide a method and apparatus for efficiently transmitting data using CQI being fed back from each user included in a multicast user group.

According to one aspect of the present invention, there is provided a method for receiving multicast service data by a terminal in a communication system. The method includes receiving a pilot from a base station, measuring channel state information using the received pilot, and transmitting the channel state information to the base station; receiving a frame from the base station, and determining whether there is an error in the received frame; when no error has occurred in the received frame, determining whether the number of frames consecutively received without error is greater than or equal to a predetermined number; and when the number of frames consecutively received without error is greater than or equal to the predetermined number, transitioning to a non-feedback state where the terminal transmits no channel state information to the base station. The frame includes multicast service data.

According to another one aspect of the present invention, there is provided a method for transmitting a multicast service signal by a base station in a communication system. The method includes transmitting a pilot to a terminal from which a multicast service request message has been received; receiving channel state information corresponding to the pilot from the terminal, and allocating resources based on the channel state information; transmitting a frame to the terminal; and releasing the resources allocated to the terminal upon receiving from the terminal a flag indicating a scheduled transition to a non-feedback state where the terminal transmits no channel state information. The frame includes multicast service data.

According to further another one aspect of the present invention, there is provided an apparatus for receiving multicast service data in a communication system. The apparatus includes a terminal for receiving a pilot from a base station, measuring channel state information using the received pilot, transmitting the channel state information to the base station, receiving a frame from the base station, determining whether there is an error in the received frame, determining whether the number of frames consecutively received without error is greater than or equal to a predetermined number when no error has occurred in the received frame, and transitioning to a non-feedback state where the terminal transmits no channel state information to the base station when the number of frames consecutively received without error is greater than or equal to the predetermined number. The frame includes multicast service data.

According to yet another one aspect of the present invention, there is provided an apparatus for transmitting a multicast service signal in a communication system. The apparatus includes a base station for transmitting a pilot to a terminal from which a multicast service request message has been received, receiving channel state information corresponding to the pilot from the terminal, allocating resources based on the channel state information, transmitting a frame to the terminal, and releasing the resources allocated to the terminal upon receiving from the terminal a flag indicating a scheduled transition to a non-feedback state where the terminal transmits no channel state information. The frame includes multicast service data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention provides a method and apparatus for efficiently using uplink resources by reducing the number of CQI feedbacks by a terminal in a communication system supporting multicast services.

Specifically, each terminal, desiring to use multicast service, transitions to a state for reducing feedback to a base station, while maintaining QoS constraint, i.e., Frame Error Rate (FER). In addition, the present invention provides a fast-request/fast-recovery method and a non-feedback count option in order to reduce the feedback that the terminal transmits to the base station.

The present invention can be applied to the existing multicast system without hardware modification, and can be used for any system including Code Division Multiple Access (CDMA), Orthogonal Frequency Division Multiplexing (OFDM), Multiple Input-Multiple Output (MIMO) system, etc.

Although a description of the present invention will be given herein for a Time Division Duplex (TDD) system where a Down Link (DL) and an Up Link (UL) are equal in channel gain, by way of example, the same can also be applied to a Frequency Division Duplex (FDD) system.

Figure 1:
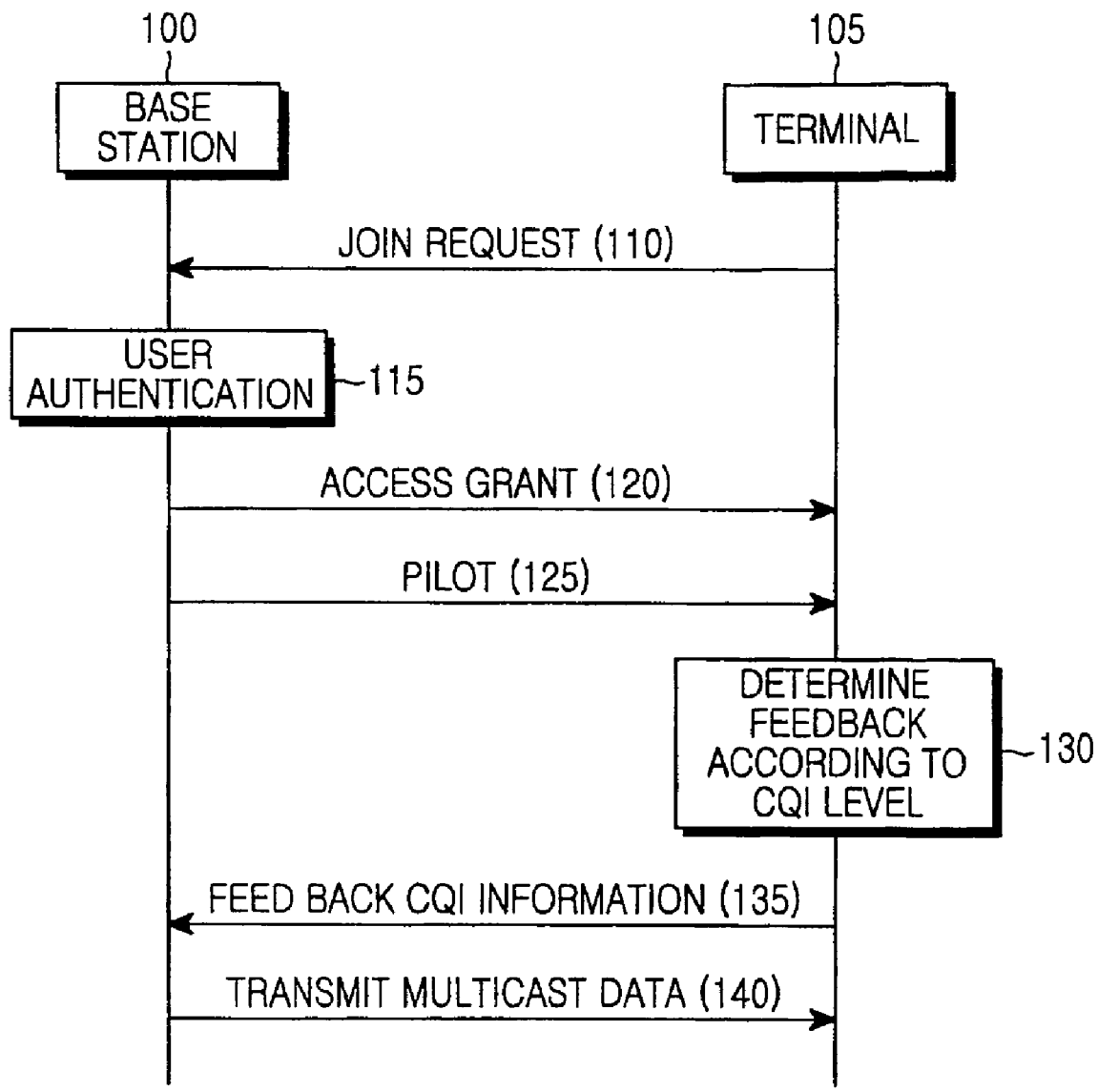
FIG. 1 is a CQI feedback signaling diagram for a multicast service according to a preferred embodiment of the present invention.

FIG. 1 is a CQI feedback signaling diagram for a multicast service according to a preferred embodiment of the present invention.

Referring to FIG. 1, in step 110, a terminal 105 sends a join request message for requesting a multicast service to a base station 100. In step 115, the base station 100 performs user authentication for the terminal 105 that has sent the join request message, and then includes the terminal 105 in a multicast group (or multicast user group). In step 120, the base station 100 sends to the terminal 105 an access grant message including a common Caller Identifier (CID) of the multicast group users and resources for an uplink control signal to be used for CQI feedback.

In step 125, the terminal 105 receives a pilot signal from the base station 100. In step 130, the terminal 105 detects a CQI level corresponding to the pilot signal, and then determines whether to perform CQI feedback to the base station 100. The method of determining whether to perform CQI feedback will be described in detail in the following embodiments. Once CQI feedback is determined, the terminal 105 feeds back CQI information to the base station 100 in step 135. Herein, CQI includes Signal Interference to Noise Ratio (SINR) and/or Bit Error Ratio (BER). In step 140, the base station 100 transmits data to the terminal 105 using the CQI.

A first embodiment of the present invention considers an initial state (initial case) where a terminal first send a request for multicast service to a base station. In this case, since the base station has no information on the terminal, the terminal feeds back CQI to the base station unconditionally.

Figure 2:
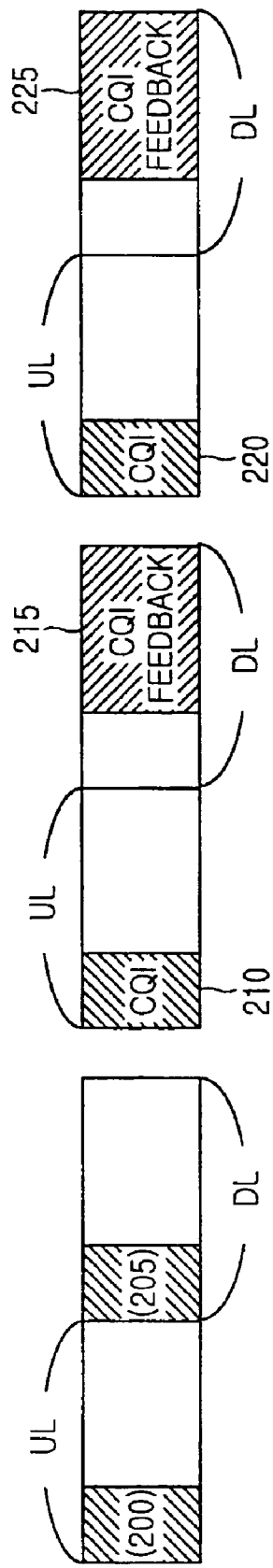
FIG. 2 is a diagram illustrating a frame structure between a terminal and a base station according to a first embodiment of the present invention.

FIG. 2 is a diagram illustrating a frame structure between a terminal and a base station according to the first embodiment of the present invention.

Referring to FIG. 2, a terminal sends a join request message to a base station through a UL frame 200. At this point, the terminal uses a Random Access Channel (RACH) for a multicast service.

Upon receipt of the join request message, the base station performs user authentication for the terminal, and includes the terminal in a multicast group of the multicast service. Thereafter, the base station sends an access grant message including a common CID of the multicast group and resources for an uplink control signal to be used for CQI feedback by the terminal, to the terminal through a DL frame 205. At this point, the base station uses a Dedicated Control Channel (DCCH). The base station has a list of terminals that it now services or will service in the future, and allocates, to the terminals included in the list, a common CID of the corresponding multicast group and resources to be used in a UL CQI Channel (CQICH). In the current state, the base station cannot determine whether the terminal will feed back CQI information. Therefore, since the terminal has first sent the request for the multicast service, it unconditionally transitions to a feedback state, and feeds back its first CQI to the base station in the next UL frame 210 using a CQICH allocated from the base station.

The base station receives the first CQI in the next DL frame 215. Similarly, the terminal transmits a second CQI in the next UL frame 220, and the base station receives the second CQI feedback in the next DL frame 225.

In a second embodiment of the present invention, a terminal, which has already sent a multicast service request to a base station and transmitted CQI feedback thereto, determines whether it will transmit CQI feedback to the base station according to its own state, and then transitions to a feedback state or a non-feedback state according to the determination.

When the terminal has transitioned to the non-feedback state, the base station automatically releases the CQICH allocated to the terminal and the terminal measures a channel state of the multicast service signal received from the base station.

Figure 3:
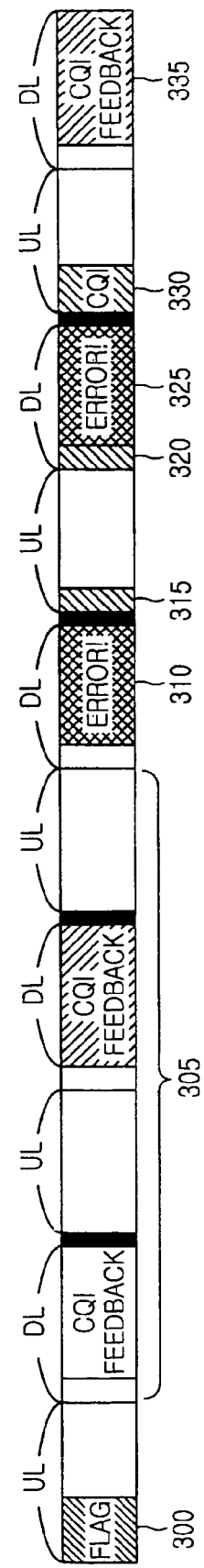
FIG. 3 is a diagram illustrating a frame structure between a terminal and a base station according to a second embodiment of the present invention.

FIG. 3 is a diagram illustrating a frame structure between a terminal and a base station according to the second embodiment of the present invention. Herein, the terminal has already sent a join request for a multicast service to a base station and received CQICH and CID from the base station.

Referring to FIG. 3, when a terminal has determined not to feed back its CQI to a base station according to its state, the terminal transmits a flag bit indicating its scheduled transition to the non-feedback state to the base station in a UL frame 300 using the CQICH, without feeding back the CQI. The flag bit is a value agreed upon between the base station and the terminal. Thereafter, the terminal transitions to the non-feedback state. Upon receipt of the flag bit, the base station withdraws the CQICH resources allocated to the terminal. At this point, the base station maintains information on the terminal without closing the corresponding session, for fast request from the terminal, and also maintains a control channel for the fast request.

Thereafter, since the feedback by the terminal is reduced as the terminal is in the non-feedback state, the base station can efficiently use UL resources for other terminals in DL and UL frames 305. In addition, since the terminal cancels the UL interference and does not perform unnecessary CQI feedback, its transmission power is saved.

When a frame error occurs while the terminal receives multicast service data from the base station in a DL frame 310, the terminal sends a notification indicating the occurrence of an error to the base station over a UL control channel in a UL frame 315. At this point, since the base station maintains its own session, the terminal has no need to re-send the join request message to be newly allocated resources for CQICH and to re-perform such procedure as authentication, making the fast request possible.

Therefore, the base station, since it has information on the terminal, allocates another control channel other than RACH so that the terminal can directly access it. For example, the CDMA system allocates Pseudo-random Noise code (PN) codes, and the OFDM system having no channel concept allocates subcarriers. Even in this case, subcarriers are allocated, the number of which is less than the number of subcarriers for CQICH, contributing to an increase in the resource efficiency.

Upon receipt of the fast request from the terminal, the base station allocates new UL CQICH resources to the terminal over a DL DCCH in a DL frame 320. In this case, since the base station has not yet received CQI information of the terminal, an error may occur even in a frame 325. That is, once an error occurs in a DL frame, an error occurs in two consecutive frames.

The terminal transmits CQI information to a base station over the new UL CQICH in a frame 330 of the next DL interval, and the base station receives the CQI feedback of the terminal in a DL frame 335.

Figure 4:
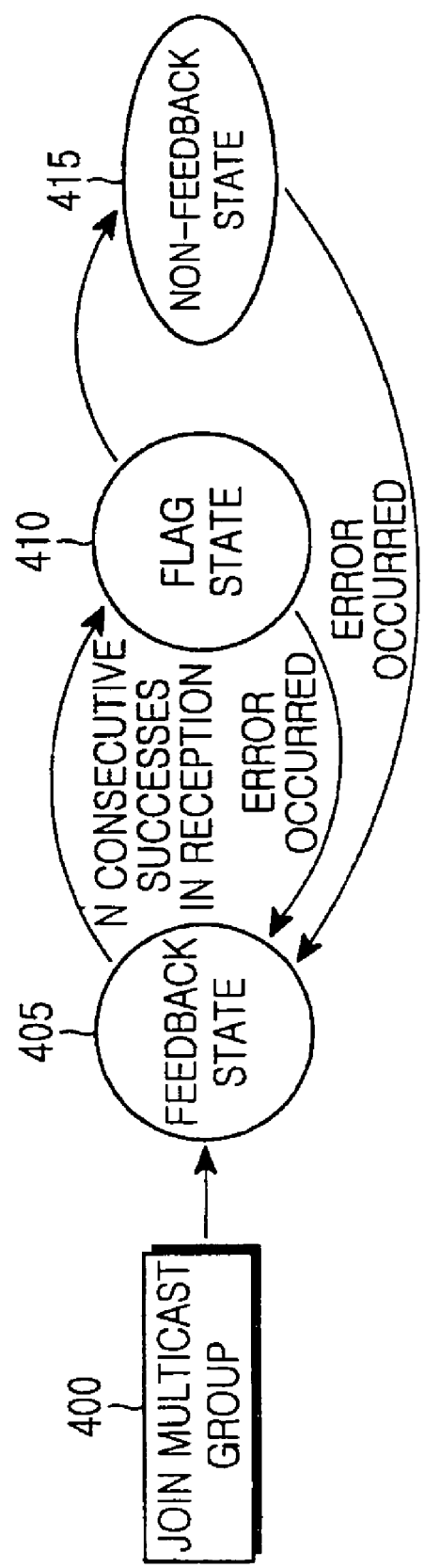
FIG. 4 is a block diagram illustrating operation states according to the second embodiment of the present invention.

FIG. 4 is a block diagram illustrating operation states according to the second embodiment of the present invention.

Referring to FIG. 4, a terminal undergoes authentication by sending a join request to a base station supporting a multicast service, and then joins a particular multicast group (See 400). Thereafter, the terminal transitions to a feedback state (See 405), and transmits its CQI to the base station over a UL CQICH allocated from the base station. The CQI is generally 5~6 bits in length.

Thereafter, if the terminal successfully receives a frame a predetermined number N of consecutive times, since there is a high probability that there will be a user having a channel gain lower than that of the terminal itself, the terminal transmits a flag bit to the base station (See 410), and then transitions to a non-feedback state (See 415). At this point, the base station withdraws the CQICH resources allocated to the terminal, and the terminal no longer feeds back CQI. The variable N is set depending on a QoS parameter. Once an error occurs in the DL interval, since two frames are damaged, it is possible to adjust FER that affects the image quality, by controlling a value of the variable N. In addition, the variable N, a hard bound value, is set such that all users in the multicast group should satisfy it.

If the number of times the terminal has successfully received a frame is less than N, the terminal feeds back its CQI to the base station while staying in the feedback state 405. Even though terminal is in the non-feedback state 415, if an error occurs during its frame reception, the terminal transitions back to the feedback state 405 and feeds back CQI to the base station.

If all terminals in the multicast group are in the non-feedback state, the base station transmits data with the channel gain value used during previous frame transmission.

In a third embodiment of the present invention, if a terminal in the non-feedback state has succeeded in consecutively receiving a frame from a base station a predetermined number N of times, the base station generates a credit and assigns it to the terminal, and the terminal determines its state transition if an error occurs during frame reception according to the presence/absence of the credit.

Figure 5:
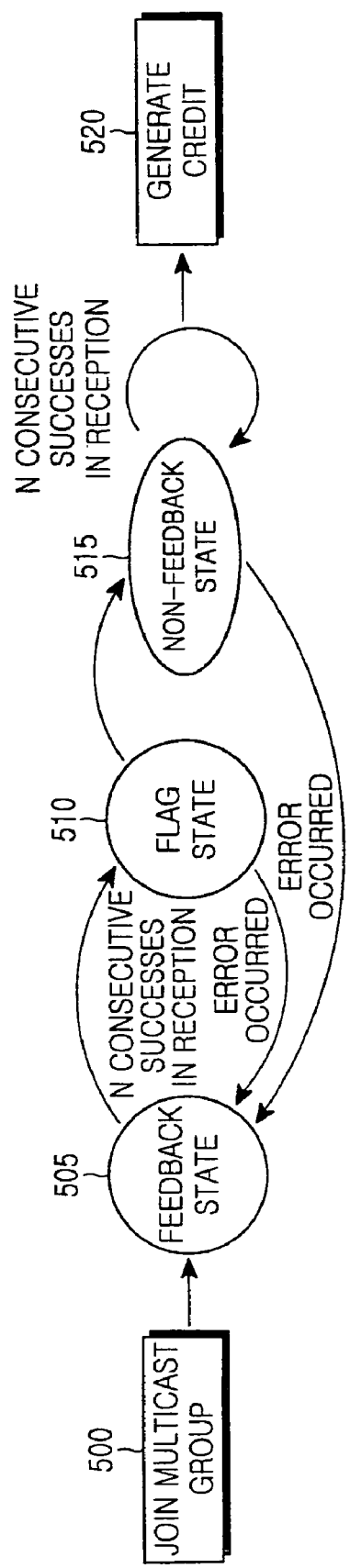
FIG. 5 is a block diagram illustrating operation states according to a third embodiment of the present invention.

FIG. 5 is a block diagram illustrating operation states according to the third embodiment of the present invention.

Referring to FIG. 5, a terminal undergoes authentication by sending a join request to a base station supporting a multicast service, and then joins a particular multicast group (See 500). Thereafter, the terminal transitions to a feedback state (See 505), and transmits its CQI to the base station over a UL CQICH allocated from the base station. The CQI is generally 5~6 bits in length.

Thereafter, if the terminal has succeeded in successfully receiving a frame a predetermined number N of times, the terminal transmits a flag bit to the base station (See 510), determining that there is a high probability that there will be a user having a channel gain lower than that of the terminal itself, and then transitions to a non-feedback state (See 515). At this point, the base station withdraws the CQICH resources allocated to the terminal, and the terminal no longer feeds back CQI. The variable N is set depending on a QoS parameter.

If the number of times the terminal has consecutively succeeded in frame reception is less than N, the terminal feeds back its CQI to the base station while staying in the feedback state 505. Even though the terminal is in the non-feedback state 515, if an error occurs during its frame reception, the terminal transitions back to the feedback state 505, and feeds back CQI to the base station.

If the terminal has consecutively succeeded in frame reception N times in the non-feedback state 515, the terminal is in the state where it can sufficiently satisfy QoS constraint and secure high image quality. Even though an error occurs during frame reception, the terminal feeds back no CQI to the base station while maintaining the non-feedback state 515 unless it satisfies QoS constraint, without directly transitioning to the feedback state 505. That is, if the terminal has consecutively succeeded in frame reception N times in the non-feedback state 515, the base station assigns a credit to the terminal (See 520). After the credit assignment, if an error occurs during the terminal's frame reception, one credit is consumed. If there are any remaining credits, the terminal keeps the non-feedback state until all the remaining credits are consumed. Thereafter, in the state where there is no credit, if an error occurs during frame reception, the terminal transitions to the feedback state 505.

In a fourth embodiment of the present invention, if an error occurs during its frame reception, a terminal directly transmits CQI without sending an access message over DCCH, making it possible to reduce the number of consecutively received frames over which an error occurs once an error occurs in a received frame, from 2 to 1.

Figure 6:
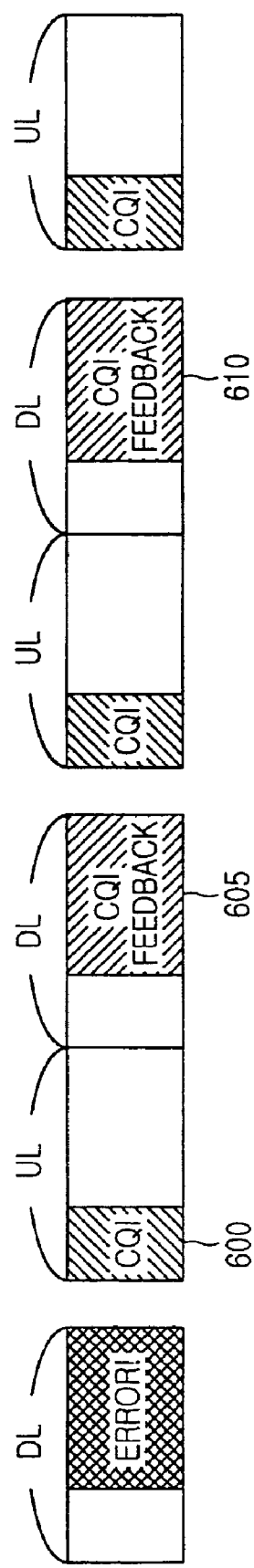
FIG. 6 is a diagram illustrating a frame structure according to a fourth embodiment of the present invention.

FIG. 6 is a diagram illustrating a frame structure according to the fourth embodiment of the present invention. Here, a base station has information on a terminal in the non-feedback state, and has previously allocated DCCH to each terminal constituting a multicast group.

Referring to FIG. 6, if an error occurs in a DL frame 600, the terminal directly transmits CQI in a UL frame 605 without sending an access message over DCCH. At this point, fast request is performed by which the base station can prevent overhead such as a process of re-performing an authentication procedure and the like. That is, it is possible to reduce the number of consecutively received frames over which an error occurs once an error occurs in a received frame, from 2 to 1.

If CQI feedback is received in the next DL frame 610 from one of DCCHs of the terminals that have transmitted a flag bit, which is separately managed, the base station immediately performs resource allocation using the CQI, thereby reducing the 2-frame error to the 1-frame error.

In this case, since it is possible to halve the variable N, which is set as a hard bound to keep a particular FER, it is possible to further reduce the CQI feedback of the terminal. That is, all terminals in the multicast group can transition to the non-feedback state faster. However, in the fourth embodiment of the present invention, since the terminal, which has suffered an error during frame reception, transmits CQI using DCCH, the base station should allocate sufficient resources for the CQI transmission.

In a fifth embodiment of the present invention, when the number of terminals which are receiving a particular multicast service from a base station is greater than the number of CQICHs allocable by the base station, the base station classifies the terminals according to their channel gains and allocates CQICHs to the terminals in order of a terminal having a lower channel gain. Thereafter, if an error occurs during frame reception of an arbitrary terminal, the base station withdraws, by compulsion, CQICH of the terminal having the highest channel gain among the terminals that have transmitted CQI, and allocates the withdrawn CQICH to the terminal that has suffered the error.

Figure 7:
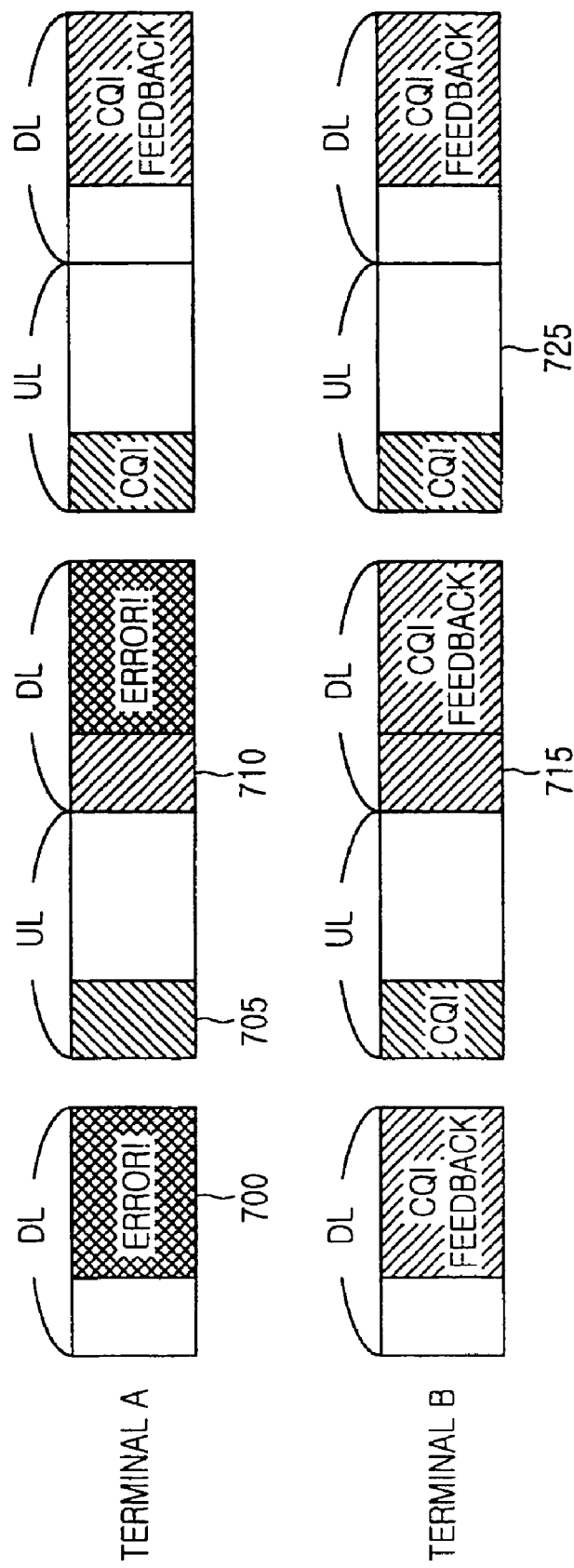
FIG. 7 is a diagram illustrating a frame structure according to a fifth embodiment of the present invention.

FIG. 7 is a diagram illustrating a frame structure according to the fifth embodiment of the present invention.

Referring to FIG. 7, if an error occurs in a DL frame 700 of a terminal A having no allocated CQICH, the terminal A sends a request for CQICH to a base station over RACH in the next UL frame 705. Upon receipt of the CQICH request from the terminal A, the base station withdraws the CQICH channel allocated to a terminal B currently having the highest channel gain among the terminals that have fed back CQI over CQICH in a DL frame 715, and then notifies the withdrawal through DCCH. Similarly, the base station notifies the withdrawal of the CQICH channel even in a DL frame 710 of the terminal A, sends an access grant message to the terminal A over DCCH, and allocates the withdrawn CQICH to the terminal A.

Thereafter, the terminal A transmits its CQI to the base station over the allocated CQICH in the next UL frame 720. The terminal B, since its CQICH is withdrawn, transmits no CQI to the base station in a UL frame 725.

Figure 8:
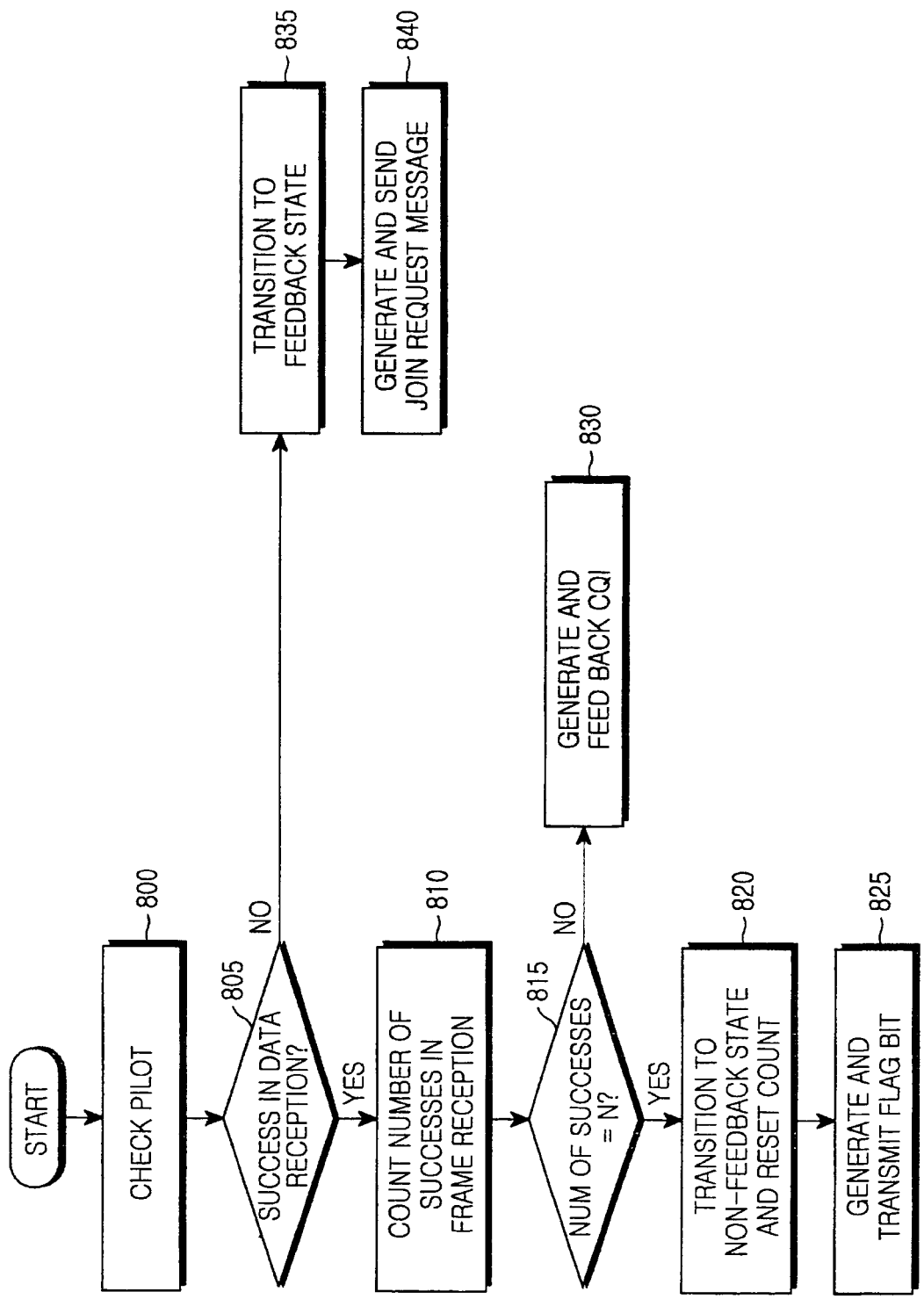
FIG. 8 is a flowchart illustrating an operation of a terminal according to the first embodiment of the present invention.

FIG. 8 is a flowchart illustrating an operation of a terminal according to the first embodiment of the present invention.

Referring to FIG. 8, in step 800, a terminal checks a pilot received from a base station to which it has sent a request for a multicast service. In step 805, the terminal determines whether a frame has been successfully received from the base station. If it is determined that an error has occurred, the terminal transitions to a feedback state in step 835, and generates a join request message and sends it to the base station in step 840.

However, if it is determined that the terminal has successfully received a frame, the terminal counts the number of successes in frame reception in step 810. In step 815, the terminal determines whether the number of successes in frame reception has reached a predetermined number N of successes in frame reception.

If it is determined that the number of successes in frame reception has reached N, the terminal transitions to a non-feedback state and resets the counted number of successes in frame reception in step 820. In step 825, the terminal generates a flag bit indicating the transition to the non-feedback state, agreed upon with the base station, and then transmits the flag bit to the base station.

However, if it is determined that the number of successes in frame reception has not reached N, the terminal generates CQI and feeds it back to the base station in step 830.

Figure 9:
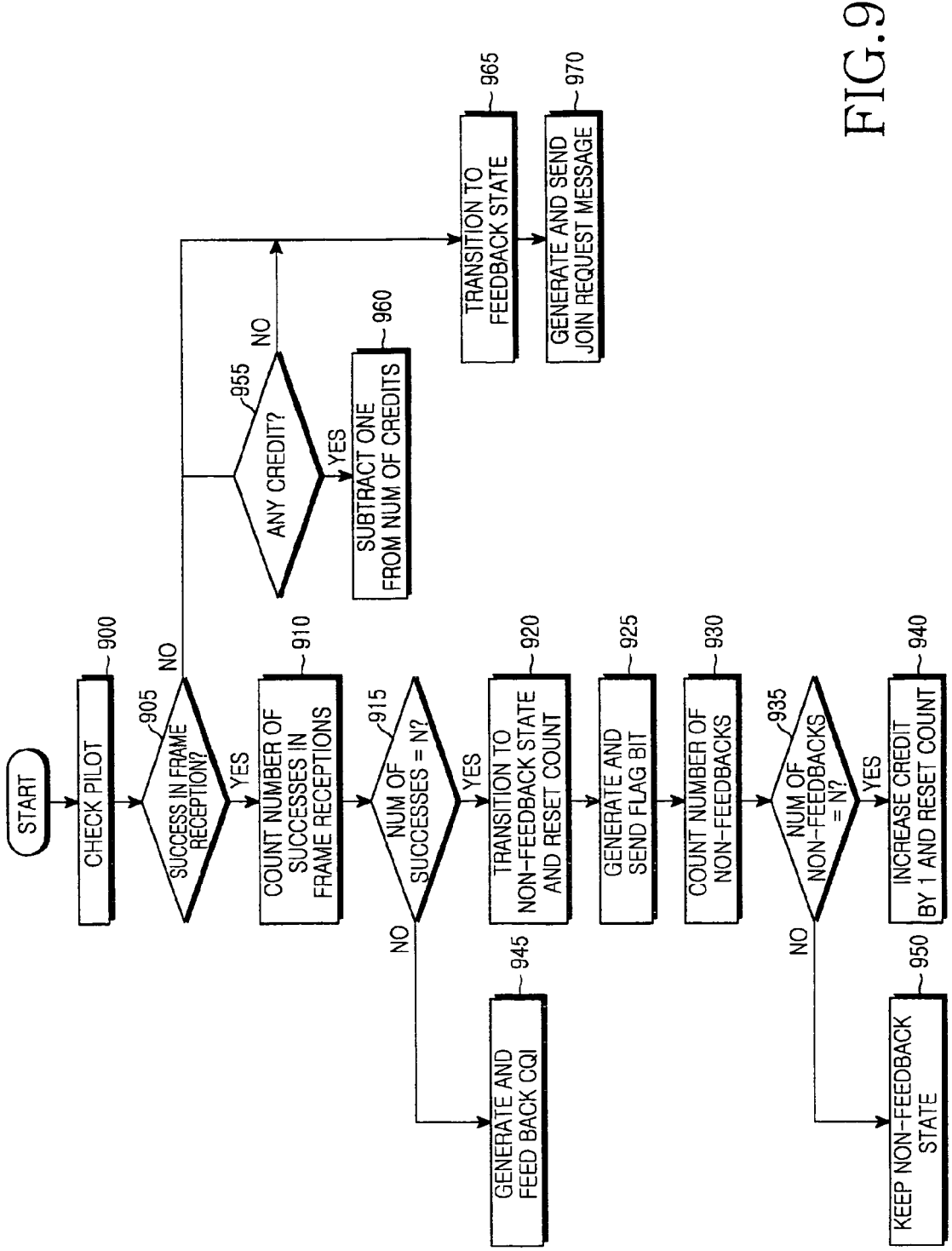
FIG. 9 is a flowchart illustrating an operation of a terminal according to the second embodiment of the present invention.

FIG. 9 is a flowchart illustrating an operation of a terminal according to the second embodiment of the present invention.

Referring to FIG. 9, in step 900, a terminal checks a pilot received from a base station to which it has sent a request for a multicast service. In step 905, the terminal determines whether a frame has been successfully received from the base station. If it is determined that the terminal has successfully received a frame, the terminal counts the number of successes in frame reception in step 910. In step 915, the terminal determines whether the number of successes in frame reception has reached a predetermined number N of successes in frame reception. If it is determined that the number of successes in frame reception has not reached N, the terminal generates CQI and feeds it back to the base station in step 945.

However, if it is determined that the number of successes in frame reception has reached N, the terminal transitions to a non-feedback state and resets the counted number of successes in frame reception in step 920. In step 925, the terminal generates a flag bit indicating the transition to the non-feedback state, agreed upon with the base station, and transmits the flag bit to the base station. In step 930, the terminal counts the number of non-feedbacks. In step 935, the terminal determines whether the number of non-feedbacks has reached a predetermined number N of non-feedbacks. If it is determined that the number of non-feedbacks has reached N, the terminal increases a credit by 1 and resets the counted number of non-feedbacks in step 940. However, if it is determined that the number of non-feedbacks has not reached N, the terminal maintains the non-feedback state in step 950.

However, if it is determined in step 905 that the terminal has failed in frame reception, the terminal determines in step 955 whether there are any credits. If it is determined that there are credits, the terminal subtracts one from the current number of credits in step 960. However, if it is determined that there is no credit, the terminal transitions to the feedback state in step 965, and then generates a join request message and sends it to the base station in step 970.

As is apparent from the foregoing description, the present invention reduces transmission power in transmitting data of the same quality, thereby reducing inter-terminal or inter-cell interference. In addition, the present invention allows the terminals receiving other multicast services or unicast services to use the surplus power, thereby facilitating user-multiplexing. Further, the present invention reduces the number of feedbacks from the terminal to the base station, so that the terminal can efficiently use the uplink resources and avoids unnecessary transmission, contributing to its power saving.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving multicast service data by a terminal in a communication system, the method comprising:
   receiving a pilot from a base station, measuring channel state information using the received pilot, and transmitting the channel state information to the base station;
   receiving a frame from the base station, and determining whether there is an error in the received frame;
   when no error has occurred in the received frame, determining whether the number of frames consecutively received without error is greater than or equal to a predetermined number; and
   when the number of frames consecutively received without error is greater than or equal to the predetermined number, transitioning to a non-feedback state where the terminal transmits no channel state information to the base station;
   wherein the frame includes multicast service data.

2. The method of claim 1, further comprising:
   transmitting a flag indicating a scheduled transition to the non-feedback state.

3. The method of claim 1, further comprising:
   after transitioning to the non-feedback state, receiving the frame from the base station, and determining whether there is an error in the received frame; and
   when an error has occurred in the received frame, transitioning to a feedback state where the terminal transmits channel state information to the base station.

4. The method of claim 1, further comprising:
   after transitioning to the non-feedback state, receiving a frame from the base station and determining whether there is an error in the received frame;
   when an error has occurred in the received frame, determining whether there is any credit; and
   subtracting one from the number of credits when there is a credit, and transitioning to a feedback state when there is no credit;
   wherein the credit is information indicating that the number of frames consecutively received without error is greater than or equal to a predetermined number.

5. The method of claim 4, further comprising:
   when no error has occurred in the received frame, determining whether the number of frames consecutively received without error is greater than or equal to the predetermined number;
   when the number of frames consecutively received without error is greater than or equal to the predetermined number, determining whether there is any credit; and
   increasing the number of credits by one when there is a credit, and generating a credit when there is no credit.

6. The method of claim 1, wherein the transmitting comprises:
   transmitting the channel state information using a channel state information channel allocated from the base station.

7. The method of claim 6, further comprising:
   after transmitting the channel state information using the channel state information channel, receiving a frame from the base station; and
   when an error has occurred in the received frame, transmitting channel state information to the base station over a dedicated control channel.

8. A method for transmitting a multicast service signal by a base station in a communication system, the method comprising:
   transmitting a pilot to a terminal from which a multicast service request message has been received;
   receiving channel state information corresponding to the pilot from the terminal, and allocating resources based on the channel state information;
   transmitting a frame to the terminal; and
   releasing the resources allocated to the terminal upon receiving from the terminal a flag indicating a scheduled transition to a non-feedback state where the terminal transmits no channel state information;
   wherein the frame includes multicast service data.

9. The method of claim 8, wherein the flag is generated when the number of frames that the terminal has consecutively received without error is greater than or equal to a predetermined number.

10. The method of claim 8, wherein the resources comprise a channel state information channel for reception of the channel state information;
    wherein the method further comprises;
    receiving channel state information of the terminal through a dedicated control channel of the terminal when an error has occurred in the multicast service data that the terminal has received.

11. The method of claim 8, wherein the allocating comprises:
    when the number of terminals that have joined the multicast service exceeds the number of allocable resources, classifying terminals receiving the multicast service in order of a terminal having a poor channel state; and
    when there is any terminal suffering an error during the frame reception, withdrawing by compulsion resources of a terminal having the highest channel gain among the terminals receiving the multicast service, and allocating the withdrawn resources to the terminal suffering an error.

12. An apparatus for receiving multicast service data in a communication system, the apparatus comprising:
    a terminal for receiving a pilot from a base station, measuring channel state information using the received pilot, transmitting the channel state information to the base station, receiving a frame from the base station, determining whether there is an error in the received frame, determining whether the number of frames consecutively received without error is greater than or equal to a predetermined number when no error has occurred in the received frame, and transitioning to a non-feedback state where the terminal transmits no channel state information to the base station when the number of frames consecutively received without error is greater than or equal to the predetermined number;
    wherein the frame includes multicast service data.

13. The apparatus of claim 12, wherein the terminal transmits a flag indicating a scheduled transition to the non-feedback state.

14. The apparatus of claim 12, wherein after transitioning to the non-feedback state, the terminal receives the frame from the base station, determines whether there is an error in the received frame, and when an error has occurred in the received frame, transitions to a feedback state where the terminal transmits channel state information to the base station.

15. The apparatus of claim 12, wherein the terminal;
after transitioning to the non-feedback state, receives a frame from the base station, determines whether there is an error in the received frame, and when an error has occurred in the received frame, determines whether there is any credit; and
subtracts one from the number of credits when there is a credit, and transitions to a feedback state when there is no credit;
wherein the credit is information indicating that the number of frames consecutively received without error is greater than or equal to a predetermined number.

16. The apparatus of claim 15, wherein the terminal;
determines whether the number of frames consecutively received without error is greater than or equal to the predetermined number, when no error has occurred in the received frame;
when the number of frames consecutively received without error is greater than or equal to the predetermined number, determines whether there is any credit; and
increases the number of credits by one when there is a credit, and generates a credit when there is no credit.

17. The apparatus of claim 12, wherein the terminal transmits the channel state information to the base station using a channel state information channel allocated from the base station.

18. The apparatus of claim 17, wherein after transmitting the channel state information using the channel state information channel, the terminal receives a frame from the base station, and transmits channel state information to the base station over a dedicated control channel when an error has occurred in the received frame.

19. An apparatus for transmitting a multicast service signal in a communication system, the apparatus comprising:
a base station for transmitting a pilot to a terminal from which a multicast service request message has been received, receiving channel state information corresponding to the pilot from the terminal, allocating resources based on the channel state information, transmitting a frame to the terminal, and releasing the resources allocated to the terminal upon receiving from the terminal a flag indicating a scheduled transition to a non-feedback state where the terminal transmits no channel state information;
wherein the frame includes multicast service data.

20. The apparatus of claim 19, wherein the flag is generated when the number of frames that the terminal has consecutively received without error is greater than or equal to a predetermined number.

21. The apparatus of claim 19, wherein the resources comprise a channel state information channel for reception of the channel state information;
wherein the base station receives channel state information of the terminal through a dedicated control channel of the terminal when an error has occurred in the multicast service data that the terminal has received.

22. The apparatus of claim 21, wherein the base station;
classifies terminals receiving the multicast service in order of a terminal having a poor channel state when the number of terminals that have joined the multicast service exceeds the number of allocable resources; and
when there is any terminal suffering an error during the frame reception, withdraws by compulsion resources of a terminal having the highest channel gain among the terminals receiving the multicast service, and allocates the withdrawn resources to the terminal suffering an error.

\* \* \* \* \*